W. H. LYONS.
ROAD GRADER.
APPLICATION FILED JULY 29, 1918.
1,318,093.  Patented Oct. 7, 1919.
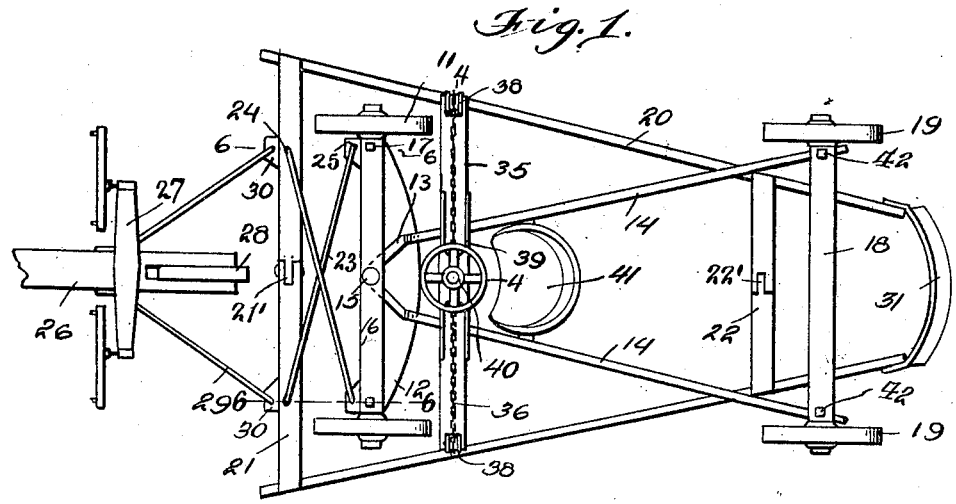
Fig. 1.
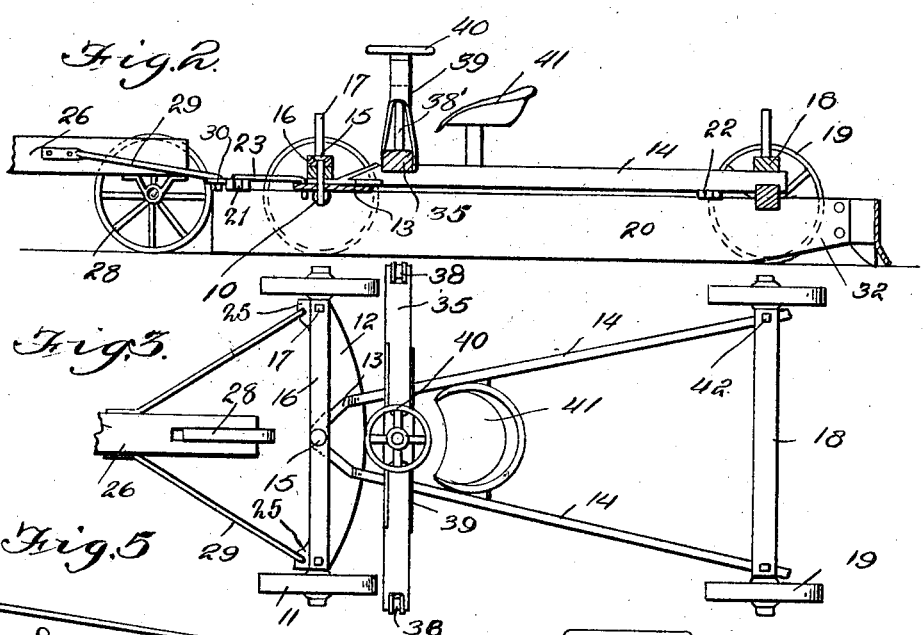
Fig. 2.
Fig. 3.
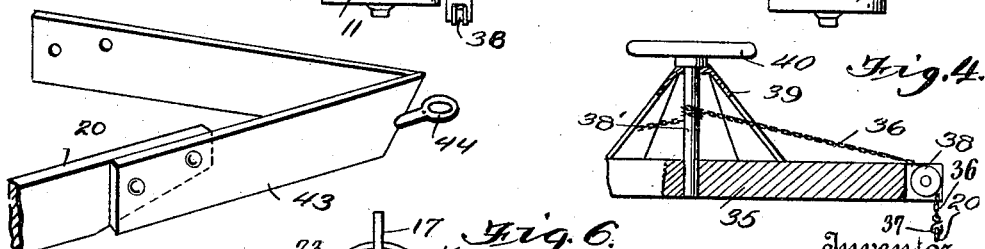
Fig. 5.
Fig. 4.
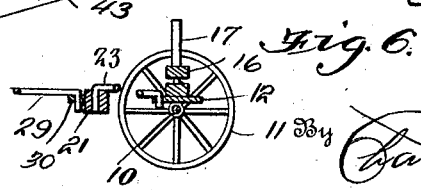
Fig. 6.
Witnesses
Inventor
W. H. Lyons
By
Attorneys

UNITED STATES PATENT OFFICE.

WILLIAM H. LYONS, OF BENA, MINNESOTA.

ROAD-GRADER.

1,318,093.  Specification of Letters Patent.  Patented Oct. 7, 1919.

Application filed July 29, 1918. Serial No. 247,323.

*To all whom it may concern:*

Be it known that I, WILLIAM H. LYONS, a citizen of the United States, residing at Bena, in the county of Cass, State of Minnesota, have invented certain new and useful Improvements in Road-Graders; and I do hereby declare the following to be a full, clear, and exact description of the invention, such as will enable others skilled in the art to which it appertains to make and use the same.

The present invention relates to new and useful improvements in road grading machines, more particularly of that type including a wheeled frame and a scraper member suspended from the frame for engagement with the road way, the suspension of said scraper member from the frame being adjustable to vary the action exerted on the road way by the adjustable member.

It is in general the object of the present invention to simplify and otherwise improve the structure and to increase the efficiency of devices of this character.

A more detailed and important object resides in the provision of a wheeled frame for adjustably suspending the scraper member which, when the machine is being transported from place to place and not in operation, may be utilized to carry the scraper member thereupon in a manner facilitating ready transportation, and wherein the draft means of the scraper member in its operative assembly with the wheeled frame may be utilized in transportation for direct connection with the wheeled frame.

With the above and other objects and advantages in view, the invention resides more particularly in the novel combination, formation and arrangement of parts hereinafter described and particularly pointed out in the appended claims.

In the accompanying drawings;

Figure 1 is a plan view of the improved grader.

Fig. 2 is a central longitudinal sectional view therethrough.

Fig. 3 is a plan view showing the wheeled suspension frame of the scraper structure utilized for supporting the scraper structure thereof in transporting the machine.

Fig. 4 is a detail sectional view taken transversely through the machine on the line 4—4 of Fig. 1.

Fig. 5 is a perspective view showing a modified use of the scraper member.

Fig. 6 is a detail sectional view on the line 6—6 of Fig. 1.

Referring now more particularly to the accompanying drawings, the supporting frame for the scraper member comprises a front axle 10 carrying the ground wheels 11 and having mounted thereon a plate 12 segmental in shape whereby its portion which extends rearwardly of the axle may form a fifth wheel supporting metallic bars 13 forming the front ends of a pair of forwardly convergent hounds 14, a king pin 15 being passed through the bars 13 and through the axle and being also passed through the bolster 16 disposed above the hound bars 13 carrying standards 17 at its ends to retain the scraper member in place on the axle when the machine is being merely transported, as will be later described. The rear ends of the hounds 14 are secured to an axle 18 on which is mounted the ground wheels 19, a complete running gear being thus provided.

The scraper member, which in normal operation of the machine is suspended from its running gear, comprises a pair of scraper sills 20 having secured to their forward end portions at their upper edges a pair of bars 21 having their inner ends hingedly connected at 21′, and secured to the rear portions of the sills is a second pair of bars 22 also having their inner ends hingedly connected at 22′, the bars 22 being considerably shorter than the bars 21 whereby when the pairs of bars are extended, the sills are held in angular relation. In the operative position of the scraper member, the sills 20 extend diagonally between the wheels at the sides of the suspension frame, whereby the forward ends of the sills lie outwardly of the wheels 11, while the rear ends of the sills lie between the wheels 19, the connecting bars 21 of the forward ends of the sills lying immediately in front of the wheels 11, and the front axle 10 is connected with the bars 21, to be drawn thereby by links 23 having their forward ends downturned to engage in sockets 24 in the bars 21 and having their rear ends downturned to engage in socket members 25 formed by apertured forwardly extending lugs on the plate 12. For drawing the entire machine, a draft tongue 26 is provided, carrying a double tree 27 and having a supporting wheel 28 mounted at its rear end, which is spaced slightly in advance of the bars 21. The tongue is connected with the bars 21 by rearwardly extending links 29 having their rear extremities downwardly directed to engage in the apertures of lugs 30 carried on the bars 21. The rear ends of the scraper sills are connected by a plate 31, which preferably has one end connected with the corresponding sill to permit ready detachment therefrom, and the rear end portions of the sills have their lower edges cut away and upwardly inclined at 32 to afford a proper grading action. The means of suspension of the scraper member from the supporting frame comprises a bar 35 extending transversely of and secured to the forward portions of the hounds 14 and having its end portions bifurcated for the reception of rollers 38, and trained about these rollers are lifting chains 36 having their outer ends connected detachably by hooks 37 with the sills 20 and having their inner ends secured on an upstanding winding shaft 38' which is journaled in the bar 33 and in an upstanding bracket 39 thereon and which carries a control wheel 40 readily engageable by an operator sitting on a seat 41 supported on the sills 14 rearwardly of the bar.

By the foregoing construction, a comparatively simple and efficient and readily manipulated grading machine has been provided wherein the draft bar is applied to the front end of the track member and from thence by the links 23 to the wheeled supporting frame of the scraper member. It would be inconvenient to transport the grading machine in its operative assembly, and to facilitate transportation of the machine when its grading operation is not desired, the draft links 23 of the supporting frame are removed, and the draft links 29 of the tongue 26 are engaged in the socket lugs 25 of the axle of the supporting frame. The scraper member is then removed from under the wheeled supporting frame or running gear and is folded by detaching one end of the rear connecting bar 31, and flexing the central hinges of the bars 21 and 22 whereby the sills 20 may rest on the front and rear axles, being held against lateral displacement on the front axle by the standards 17 and being held against lateral displacement on the rear axles by standards 42. The adaptation of the machine for transportation may thus be readily carried out, and utilizes a definite coaction between various parts of the machine operative in other relations in the grading assembly of the machine.

To utilize the scraper member in cleaning snow from the road, or under other conditions wherein its full dragging force may be exerted, the scraper member may be removed from the wheeled supporting frame and a V-shaped head plate 43 substituted for the connecting plate 31 at the normally rear ends of the sills, and the scraper member drawn by a suitable draft means secured to an eye 44 at the angle of said head plate.

What is claimed is:

1. A road grader comprising a main frame including front and rear axles and ground wheels, scraper sills converging rearwardly under the main frame, a bar connecting the forward ends of the scraper sills and disposed forwardly of the main frame, socket members on the front axle, links having one end engaged in said socket members and the other end connected with the forward bar, socket members on the forward bar, a draft truck, links extending rearwardly from said draft truck and interchangeably engageable in the socket members of the forward scraper bar or of the main frame, means carried by the main frame for adjustably suspending the scraper when in use, and means on the axles for supporting the scraper when not in use.

2. A road grader comprising a main frame including front and rear axles, ground wheels on said axles, and standards on the axles; combined with scraper sills extending diagonally under the main frame, the forward ends of the sills being disposed outside of the front wheels and the rear ends thereof between the rear wheels, a bar connecting the rear ends of the scraper sills, a bar connecting the forward ends of the scraper sills and disposed forwardly of the main frame, hinges at the midlength of both bars whereby the entire scraper may be folded and laid on the main frame, links removably connecting said forward bar, and and the front axle, a draft means for said forward bar, and means carried by the main frame for adjustably suspending the sills.

3. A road grader comprising a main frame including front and rear axles, ground wheels on said axles, scraper sills extending diagonally under the main frame, the forward ends of the sills being disposed outwardly of the wheels of the front axle, the rear ends of the sills being disposed between the wheels of the rear axle, a plate connecting the rear ends of the scraper sills, a bar connecting the forward ends of the scraper sills and disposed forwardly of the main frame, socket members at the forward ends of the main frame, links having portions engaged in said socket members and connected with the forward bar, socket members on the forward bar, a draft truck, links extending rearwardly from said draft truck and interchangeably engageable in the socket members of the forward scraper sill bar and the socket members of the main frame and means carried by the main frame for adjustably suspending the scraper sills.

In testimony whereof I affix my signature in the presence of two witnesses.

WILLIAM H. LYONS.

Witnesses:
 GEO. E. SCOTT,
 C. M. KING.